March 27, 1962 — F. J. BAUME — 3,027,024
PARKING BUILDING FOR VEHICLES
Filed April 12, 1960 — 4 Sheets-Sheet 2
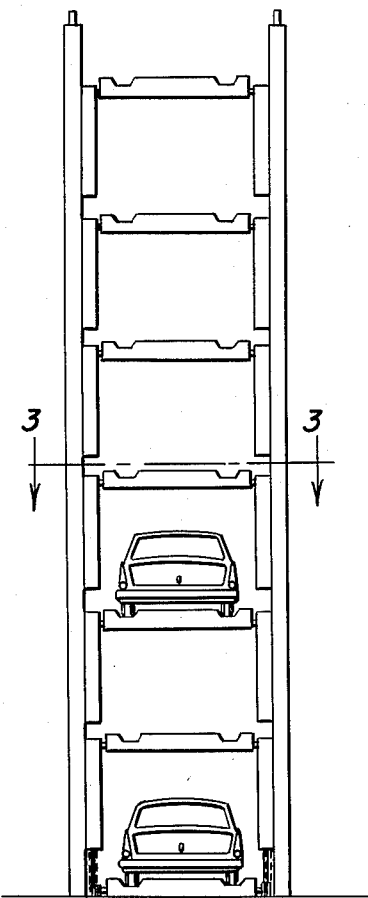
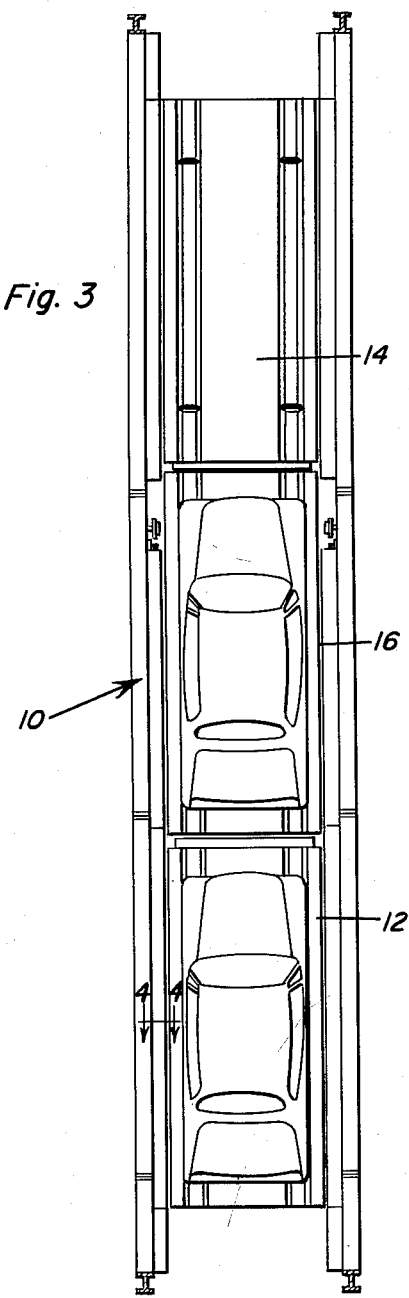
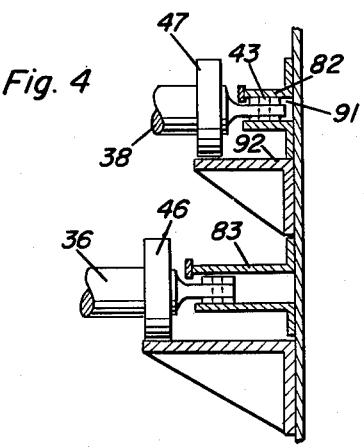
Frank J. Baume
INVENTOR.
BY Clarence A. O'Brien
and Harvey B. Jacobson
Attorneys March 27, 1962  F. J. BAUME  3,027,024
PARKING BUILDING FOR VEHICLES
Filed April 12, 1960  4 Sheets-Sheet 3
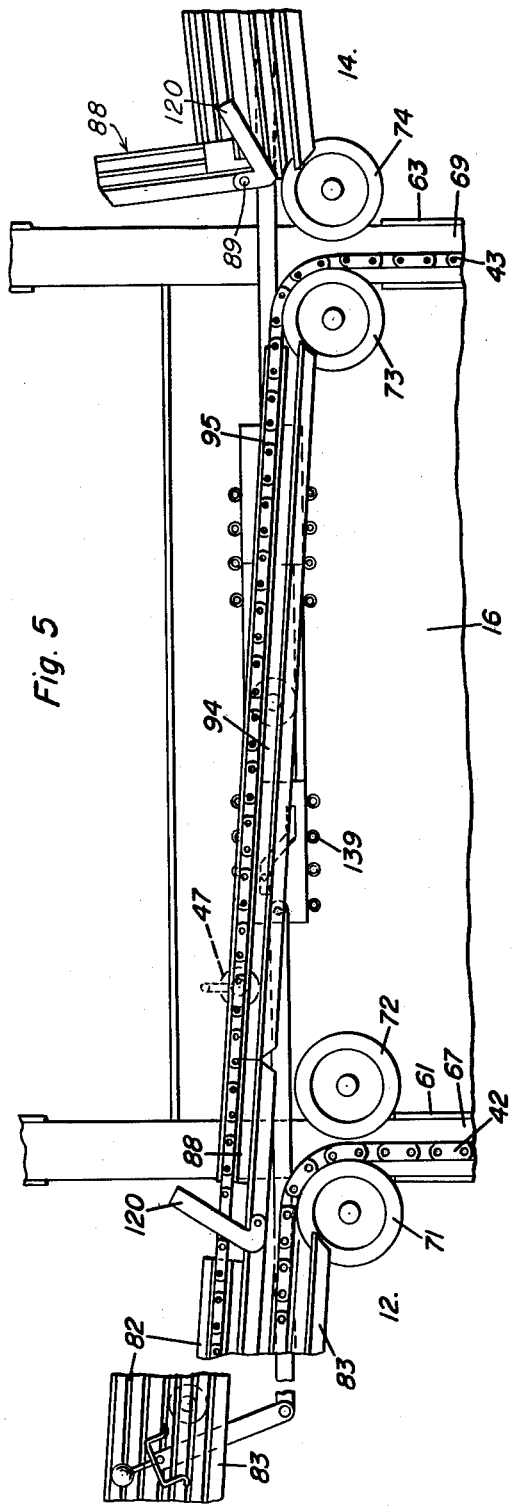
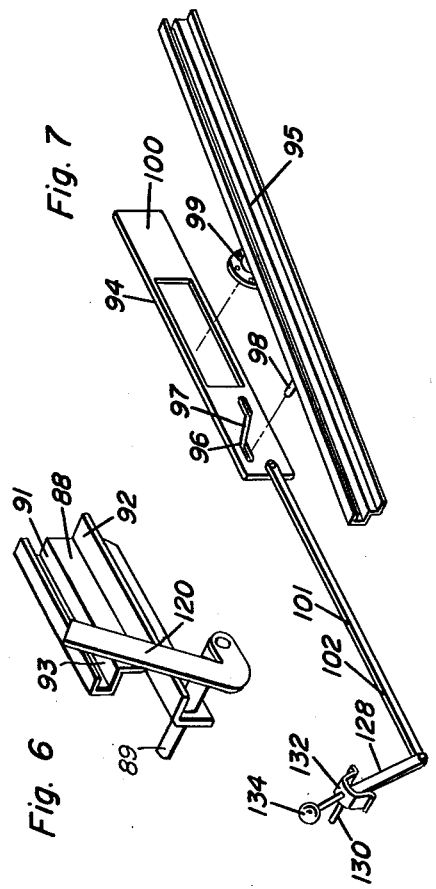
Frank J. Baume
INVENTOR.
BY *Clarence A. O'Brien*
*and Harvey B. Jackson*
Attorneys March 27, 1962 F. J. BAUME 3,027,024
PARKING BUILDING FOR VEHICLES
Filed April 12, 1960 4 Sheets-Sheet 4
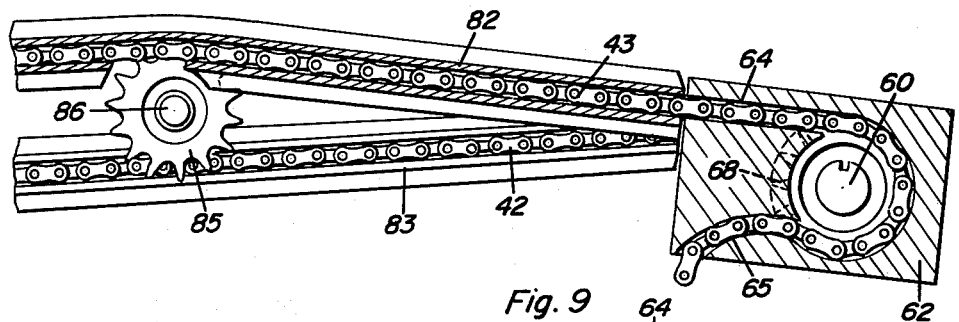
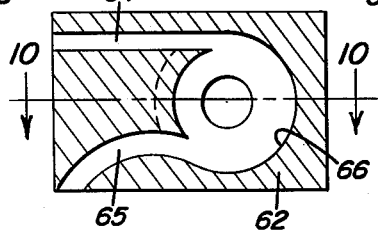
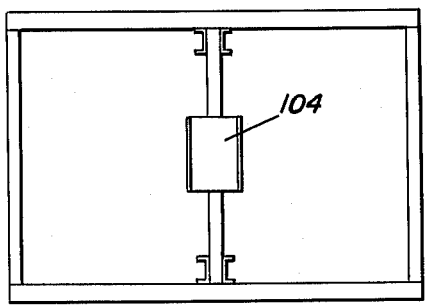
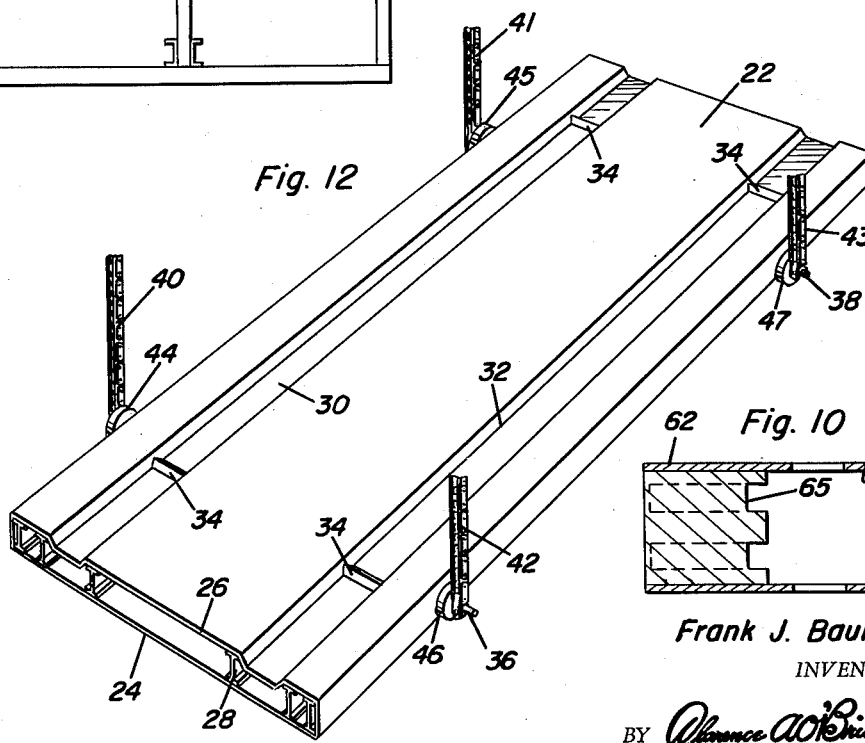
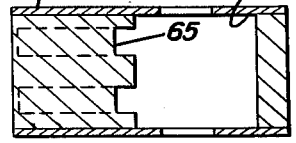
Frank J. Baume
INVENTOR.

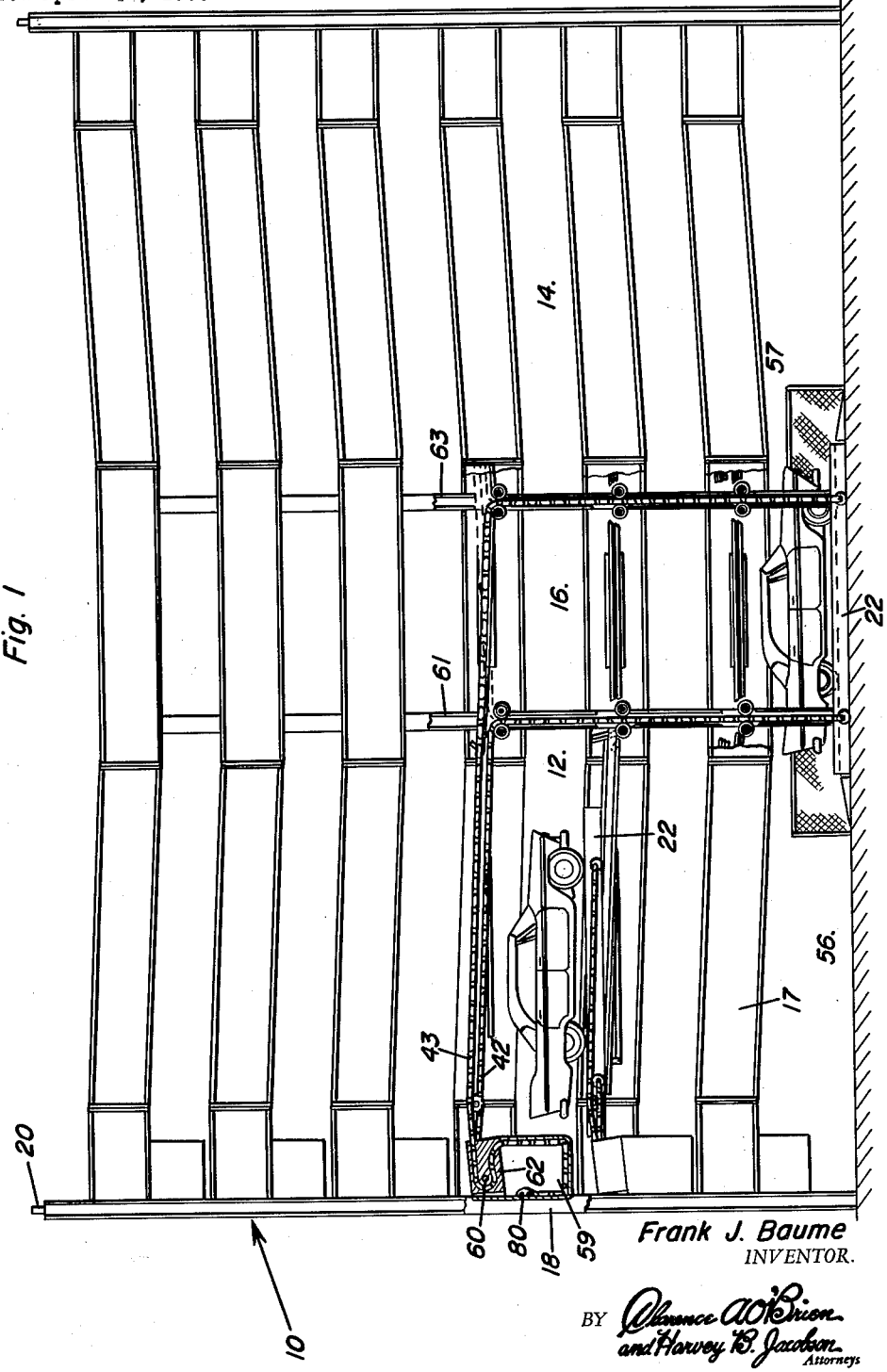

United States Patent Office 3,027,024
Patented Mar. 27, 1962

3,027,024
PARKING BUILDING FOR VEHICLES
Frank J. Baume, P.O. Box 1656, San Francisco, Calif.
Filed Apr. 12, 1960, Ser. No. 21,649
15 Claims. (Cl. 214—16.1)

This invention relates to parking buildings and more particularly to improvements in both construction and technique for general storage and parking motor vehicles by mechanical devices.

The invention provides improvements over my prior Patents No. 2,658,632 and No. 2,824,654, particularly the latter patent.

Automatic mechanical—usually electro-mechanical—parking of vehicles in tiers of specially constructed buildings has been successfully accomplished, and the desirability of such buildings and automatic parking facilities is established.

The complexity of known parking systems which rely on elevators or an elevator to place vehicles, usually automobiles, on various levels of the building, where an operator has to accompany the elevator or elevators to move the automobile off the elevator and drive it into a stall is avoided by this invention thereby eliminating rough handling of automobiles. Further, the more complex complicated equipment and machinery to accomplish fully automatic parking is also eliminated. Small maladjustment of such complicated equipment has often caused damage to automobiles.

An object of the invention is to provide a building structure of the type having a number of tiers with individual parking stalls, together with a common hatch for all of the stalls, individual cage structures or a simple platform for each stall, and independent motivating means for each cage or platform. The motivating means preferably consists of sufficient motor control devices and elongate flexible members, e.g. chains, fastened to the ends of the individual cage or platform and force-guided in tracks whereby the chains function to both push and pull the cage or platform. This pushing and pulling function attributable to the chains is disclosed in one of the previously mentioned patents, however the manner and structure for guiding and actually utilizing the chains is improved by virtue of this invention. As pointed out previously, simplicity is one of the principal features of the invention and in order to obtain this simplicity, the structure of the invention utilizes only one pair, respectively with twin pairs of overhead rails housing the chains and rollers for the sole support of the cage or platform. No supporting floor or floors in the tiers of the building are necessary, and this is a great structural advantage resulting in considerable economy in the building itself.

Another object of the invention is to provide an improved rail and chain system for a vehicle parking building, wherein there are solely two overhead rails arranged for each vehicle stall, the rails joining a common vertical guide for the rails of each stall. The vertical guide means are longitudinally co-extensive with the elevator hatch.

Other objects and features of importance will become apparent in following the illustrated form of the invention which is given by way of example only.

FIGURE 1 is a side elevational view of a typical structure embodying the principles of the invention and showing one vehicle in one of the stalls and another vehicle prepared to be raised to another stall.

FIGURE 2 is an end view of the building in FIGURE 1.

FIGURE 3 is a top view of the building in FIGURE 1.

FIGURE 4 is an enlarged fragmentary sectional view showing a detail of the fixed track section in a stall and taken on the line 4—4 of FIGURE 3.

FIGURE 5 is an enlarged fragmentary sectional view showing details of the crossover mechanism.

FIGURE 6 is a perspective view showing a further detail.

FIGURE 7 is an exploded perspective view showing crossover mechanism details.

FIGURE 8 is another fragmentary sectional view showing the push-pull chain.

FIGURE 9 is a sectional view disclosing a portion of the structure in FIGURE 8.

FIGURE 10 is a sectional view taken on the line 10—10 of FIGURE 9.

FIGURE 11 is a top view of an emergency hoist mounted in the center of the elevator hatch.

FIGURE 12 is a perspective view of a typical platform or cage used in the building of FIGURE 1.

It is very desirable to be able to construct a practical vehicle parking building in prefabricated sections when any practical height may be obtained by merely adding sections either sidewise or vertically. However, in semi-mechanical parking systems where single elevators are used to service a number of stalls, this is impractical inasmuch as the elevator hatch must be extended along with the extension of the elevator equipment. In systems employing individual cages for each stall, but relying on central or even interconnected means to operate each cage, the addition of vehicle parking structural units or sections presents other serious mechanical problems in connecting the motivating means for the newly added cages. Such difficulties are overcome in the illustrated form of the invention, wherein a building 10 (FIGURES 1–3) is composed of a number of structural sections or units stacked to the desired height. Although only a few units are shown in FIGURE 1, any practical number may be used as found desirable. Each unit consists of two stalls in confronting relationship to each other, for instance stalls 12 and 14 (FIGURE 1). An elevator hatch 16 is also included in a single unit, and when the units are stacked to form a building they constitute tiers of that building and each tier contains two stalls and its elevator hatch. Obviously, this modular type of construction will allow sections to be placed side-by-side in any number, for example a part of an entire city block or fragment thereof may have any practical number of modules side-by-side and vertically stacked.

Tier 18 containing stalls 12 and 14 and hatch 16 typifies the others in many respects. In other words, all of the tiers are made the same and structurally fabricated using ordinary building techniques when erecting the building 10. The framework of building 10 is not unusual in the sense that structural steel is used relying on the ordinary engineering techniques to form the frame of the building of corner posts and horizontal bracing so that there results a rigid structural framework which may have a facing of any type thereon, although this is certainly not an essential requirement of the present invention. One of the structural framing techniques which may be adopted is to use dowel pins 20 at the corners of each section or unit and after emplacement with the adjacent matching opening in an adjacent section, the units may be welded together and obviously, the dowl pins will assure proper registration of the units.

There is a single elevator platform 22 for each stall. Although the term "platform" is used herein, it is to be clearly understood that this word is not restricted in meaning to a single horizontal member such as shown in FIGURE 12, but may include any type of elevator cage structure. Platform 22 is also of structural frame construction so that it may be made strong and light. There are two panels 24 and 26 interconnected by bridging 28, and two channels 30 and 32 are formed in panel 26 to form tracks for the wheels of the motor vehicle. Corrugations 34 are in the tracks to form stops for the wheels of the motor vehicle. There are two shafts 36 and 38 mounted for rotation in bearings (not shown) in platform 22, and the shafts have parts which project laterally outwardly from the side edges of the platform. Four chains 40, 41, 42 and 43 are attached to the end parts of the shafts, and the same end parts of these shafts accommodate four rollers 44, 45, 46 and 47.

As shown in FIGURE 1 the lowermost section 17 is elevated from ground level so that a driveway 51 exists below it. Loading station 57 is at the center of the driveway, and the loading station is actually the lower end of the elevator hatch 16. A typical platform 22 is shown in the loading station 57 (FIGURE 1), and in the functioning of the parking building, the platform in the driveway is elevated to a particular tier and moved laterally into one of the stalls of that tier by means of the four chains such as chains 40, 41, 42 and 43 (FIGURE 12). Each stall has a single platform and a single motor to actuate the chains, i.e., to push or pull them depending on the direction of rotation of the motor. Although a large number of motors may be required, it is believed that the additional cost is more than offset by the elimination of complex elevator systems and controls and by the inherent reliability of single small, intermittently operated motors as opposed to a more or less conventional elevator with the electrical system under a high demand operational condition. For example, if only one elevator system were incorporated in a parking building, that elevator system may have to park hundreds of automobiles during the day. However, individual motors for individual stalls will operate far less than this.

Typical section 18 has two identical stalls 12 and 14, and stall 12 is equipped with a receptacle 59 for the storage of the four chains 40, 41, 42 and 43 during the operation of the platform 22. Receptacle 59 is essentially the same as the corresponding receptacle in my later prior patent, and the motor for operating the chains is also the same or essentially the same as to function and location. The motor has a motor operated shaft 60 extending therefrom, and the motor is reversible so that the shaft 60 is positively driven in a clockwise or counterclockwise direction. Chain guide 62 (FIGURES 8 and 9) has a passageway 64 extending therethrough with a lower part 65 thereof curved downwardly to guide one of the chains into the receptacle 59 when the chains are payed into the receptacle. Sprocket cavity 66 is in the guide 62 and supports sprocket 68 which is rigidly secrued to shaft 60. Inasmuch as four chains are required for platform 22, shaft 60 has four identical sprockets 68 thereon and there is a corresponding number of passageways 64 for the four chains.

The hatch 16 is defined by four vertical rails such as rails 61 and 63. The rails are made of structural steel, for instance channels or I beams to define passageways 67 and 69 for the chains. The chains and mechanisms associated with the chains are identical for each stall, the platform (FIGURE 12) being symmetrical about a longitudinal centerline and the structure associated therewith on either side of the platform also being merely duplicated. Only chains 42 and 43 are therefore shown by FIGURE 5 in detail as to functional utility. A part of hatch 16 shown in FIGURE 1 is therefore also reproduced in FIGURE 5 and at stall 12 there are rollers which form guides 71, 72, 73 and 74 mounted for rotation on spindles attached to the rails 61 and 63. The guides are in pairs, leaving a part of passageways 67 and 69 open. Referring now to the receptacle end of chain 43 (FIGURE 1), it is evident that the end of the chain is anchored as at 80 in the receptacle. As previously described the chain is driven by sprocket 68, and the chain 43 of the pair under consideration, is simultaneously driven. FIGURE 8 shows track sections 82 and 83 which form guide means for chains 42 and 43. The track section 83 is inclined upwardly slightly from idler sprocket 85 located between chains 42 and 43, and there is suitable structural framing for the spindle 86 of the idler sprocket.

While section 82 is angled upward slightly, section 83 of the tracks is angled downward slightly for proper feeding of sprockets 68.

Referring now to FIGURE 5 the track sections 82 and 83 have portions shown closely adjacent to the rail 61. The sections 82 and 83 terminate a short distance from one surface of rail 61, i.e., the surface in stall 12. Jumper 88 which is in the form of a short track section is pivotally connected by means of a pin 89 for movement between an approximately vertical position and an approximately horizontal position in alignment with the section 82. Chain 42 extends over guide 71 and enters directly into the track section 83. However the chain 43 must travel from the opposite side of hatch 16 and therefore, it must cross over jumper 88 which is articulate between said approximately vertical and approximately horizontal positions, as respectively shown in FIGURE 5 on opposite sides of the hatch 16. At this point the configuration of the track sections may be considered with reference to FIGURE 4 and FIGURE 6. The track sections function as constrainers with the ends of the platform shafts 36 and 38 disposed therein and with the wheels or rollers 44, 45, 46 and 47 of the platform mounted thereon. Consequently, the cross-section of the jumper and of the track sections 82 and 88 will have a laterally opening channel 91 and a horizontal way 92 therebelow and vertically offset from the bottom 93 of the channel 91. The extremity of one of the shafts, for instance shaft 38 and the chain, for instance chain 43 is held captive in channel 91 (FIGURE 4), while typical roller 47 is mounted on way 92. This allows the chain to be a push-pull mechanical element capable of transmitting force by either pushing or pulling the chain. The chain shown in the drawing is a conventional roller chain, and by constraint such as disclosed therein, a flexible cable is a very reasonable substitute for the chain configuration.

A crossover mechanism 94 is structurally mounted for oscillation in hatch 16. The crossover mechanism allows one wheel of platform 22 to be guided transversely across hatch 16 and also guides the chain 43 in a push-pull enabling, constrained condition to be moved across the hatch. Crossover mechanism 94 is made of a section 95 of a rail which is aligned with jumper 88 as shown in FIGURE 5, but which can be tilted by the cam 96. The cam is in the form of a slot 97 with a cam follower such as pin 98 working therein. The cam follower is secured to section 95, and the section is mounted on a single pivot bearing 99 in the hatch, i.e., secured to a structural framing member which extends transversely across the hatch. Slot 97 is cut in a plate 100, and there is a linkage 101 to operate the section 95, i.e., to reset it. The reset mechanism 102 of which linkage 101 constitutes a part, will be described in detail in connection with the operation. However, prior to a complete description of the operation, attention is invited to FIGURE 11 showing an emergency elevator 104 which may be maintained, i.e., stored at the top or bottom of the elevator hatch 16. The emergency elevator 104 contains its own motor and is constructed along the lines of a hoist to lift and lower personnel and possibly a disabled motor vehicle under emergency conditions. Since the elevator hoist structure for elevator 104 is conventional, no details are thought to be required.

Assume that the elevator platform is being raised by simultaneously pulling the four chains by means of actuation of the power operated shaft 60. As the platform moves vertically up hatch 16 the studs defined by the ends of shaft 38 move upwardly until they enter the crossover mechanism 94, i.e., track 95 thereof. Typical wheel 47 rides upon the lower surface or way of track 95 as shown in dotted lines in FIGURE 5. At the same time that the jumper 88 is pivotally actuated to an upright position by the stud end of shaft 38 the front wheel 47 enters the way of track section 82. In the arrangement shown in FIGURE 5 and also shown in FIGURE 4, the "front" roller of the platform operates in the upper section 82 and the "rear" roller operates in the lower section 83. The expressions "front" and "rear" are interchangeable depending on the point of view, however the inclination of the rails are such that the platforms tend to slide toward the hatch 16 when the platforms are in the rest position so that they are more easily "pushed" from the stalls into the hatch. This is to relieve some of the burden of the pushing function of the flexible elongate members (chains), and the automatic brakes on the motors that drive shafts 60 are sufficient to hold the platform very safely in position in the stall.

The jumper 88 is removed from its bridging relation to passage 67 by the lever 120 which is secured thereto (FIGURES 5 and 6). The jumper moves to an upward position in preparation for reversing movement which takes place when the platform is to be removed from the stall 12. A typical jumper 88 and lever 120 is shown in the up position on the right side of FIGURE 5.

When the platform is entering the stall 12, the reset linkage 102 is actuated by the forward roller of the platform. This is accomplished by operation of a rocker 128 which is mounted for oscillation by means of a stud 130 attached to the rocker and rotationally disposed in a bearing opening in the track section 82. Yoke 132 is attached to the rocker 128 and has an upper arm 134 fixed thereto. The arm is weighted on the top to maintain it better in position as it swings as shown in FIGURE 5. A spring could be used for this purpose, but a weight is simpler and is preferred. The forward wheel of the platform engages the yoke 132 causing it to oscillate so that rocker 128 is turned, pulling link 102 which is pivoted to it. This moves the cam plate 100 causing the change-over mechanism 94 to align itself with the crossing rails from either side when the cam is moved forward or reverse. Since the change-over mechanism 94 is pivoted in the center it takes very little effort to swing it. Suitable means, for instance upper and lower groups of rollers 139 attached to a structural member in the hatch, constrain the motion of the cam plate 100 to a back and forth motion, although the rail section 95 thereof is mounted on a single pivot 99.

In withdrawing the platform 22 from stall 12, the jumper 88 is pushed to a position at which the jumper has its ends aligned with section 82 and section 95. No particular difficulty exists in connection with the rollers associated with chain 42 since they directly enter the space between guides 71 and 72.

Before the platform touches the ground a limit switch is used to de-energize the motor, and the magnetic brake on the same stops and holds the platform with a soft landing action. After the motor is de-energized the gate mechanism, if one is used, opens and the vehicle can be boarded for driving out. The limit switch and means for creating a soft landing action of the platform are identical to those used with conventional elevators.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A parking building for vehicles wherein the building has a plurality of stalls with a hatch therebetween, upright rails defining said hatch, a platform for each stall, flexible elongate means connected with each platform to individually raise and lower the platform, rail sections on opposite sides of each stall and constraining the movement of said flexible elongate means, one of said flexible elongate means being on one side of the hatch and another of said flexible elongate means being on the other side of said hatch, crossover means in said hatch guiding said one of said elongate means to and from the last mentioned stall, said crossover means including a rail section, means pivoting said rail section in said hatch, means operatively associated with said rail section for constraining said flexible elongate means whereby said elongate means are converted to mechanical pushing and pulling elements.

2. A parking building for vehicles wherein the building has a plurality of stalls with a hatch therebetween, upright rails defining said hatch, a platform for each stall, flexible elongate means connected with each platform to individually raise and lower the platform, rail sections on opposite sides of each stall and constraining the movement of said flexible elongate means, one of said flexible elongate means being on one side of the hatch and another of said flexible elongate means being on the other side of said hatch, crossover means in said hatch guiding said one of said elongate means to and from the last mentioned stall, said crossover means including a rail section, means pivoting said rail section in said hatch, means operatively associated with said rail section for constraining said flexible elongate means whereby said elongate means are converted to mechanical pushing and pulling elements, a jumper having flexible elongate guiding means connected therewith, means pivotally mounting said jumper between said crossover means and one of said rail sections.

3. The subject matter of claim 2, wherein there are mechanical means connected with said jumper for moving said jumper in a pivotal manner.

4. The subject matter of claim 3, wherein one of said rails defining said hatch has a passage therein accommodating a portion of said flexible elongate means, and said jumper bridging said passage.

5. The subject matter of claim 1, wherein said means for actuating said crossover means have a portion disposed in the last mentioned stall and are actuated by a part of the platform as it moves in said stall.

6. In a parking building which has a plurality of stalls arranged in tiers and an elevator hatch at the confronting ends of pairs of stalls, a platform for each stall, a single platform and a single stall having individual motor operated means for raising the platform up the hatch and for moving the platform into said stall, the last mentioned means including front and rear flexible elongate members attached to said platform and located on opopsite sides of said hatch, said stall having a pair of laterally spaced track sections, one of said elongate elements entering said track section substantially directly, crossover means in said hatch by which the other of said elements is constrained for entering said stall, said crossover means being in the form of a track, and a jumper between the adjacent ends of the crossover track and one of said sections to constrain said other of said elongate elements.

7. The subject matter of claim 6, wherein said section and said track and said jumper each have ways thereon, and said platform having rollers engaging said ways.

8. The subject matter of claim 6, wherein said crossover means are movable and said jumper is movable, and means rendered operative by engagement with a part of said platform for adjustably moving said jumper.

9. The subject matter of claim 6, wherein said crossover means are movable and said jumper is movable, and means rendered operative by engagement with a part of said platform for adjustably moving said crossover means.

10. The subject matter of claim 8, wherein said section and said crossover means have channels within which said elongate means are confined for axial movement so that said elements become capable of a mechanical push and a mechanical pull function.

11. In combination with a parking structure for vehicles having a vertical passageway in communication with a plurality of vertically spaced stalls on opposite sides thereof, and vehicle carrying carriages vertically movable through said vertical passageway and laterally movable to and from associated stalls; carriage moving means comprising, flexible transmitting means retractibly mounted within each stall and operatively connected to an associated carriage, fixed guide means receiving said flexible transmitting means within the vertical passageway and stalls and movable guide means mounted in spaced relation to the stalls within the vertical passageway and operative in response to approach of a carriage toward the vertical passageway from an associated stall to move to a position aligned with said fixed guide means for subsequently guiding the flexible transmitting means between said stall and the vertical passageway.

12. The combination of claim 11 wherein said carriages mount guide roller means at spaced locations therealong, said flexible transmitting means being terminally connected to said guide roller means.

13. The combination of claim 12, wherein said movable guide means includes channel means for receiving the flexible transmitting means and track means for supporting the guide roller means thereon.

14. The combination of claim 11, wherein said movable guide means comprises a pivotally mounted track section and cam means operatively connected to the track section and engageable by a carriage.

15. The combination of claim 14 wherein said track section mounts a channel for receiving said flexible means and a track for supporting the carriage.

References Cited in the file of this patent
UNITED STATES PATENTS

| | | |
|---|---|---|
| 1,584,212 | Burrell | May 11, 1926 |
| 2,824,654 | Baume | Feb. 25, 1958 |